United States Patent
Eikelenboom

[15] 3,672,075
[45] June 27, 1972

[54] TRAINING APPARATUS

[72] Inventor: Matthijs Johan Eikelenboom, Sweelinckplein 50, The Hague, Netherlands

[22] Filed: Aug. 21, 1970

[21] Appl. No.: 65,780

[52] U.S. Cl. .................................. 35/29 R, 272/53.2, 35/11
[51] Int. Cl. .................................................. G09b 9/00
[58] Field of Search .................... 35/11, 29 R; 272/53.2, 52, 272/52.5, 53.1

[56] References Cited

UNITED STATES PATENTS

| | | | |
|---|---|---|---|
| 2,095,871 | 10/1937 | Hite | 272/53.2 |
| 3,037,769 | 6/1962 | Deady | 272/53.2 X |

FOREIGN PATENTS OR APPLICATIONS 178,110  11/1906  Germany ................................ 35/11

*Primary Examiner*—Harland S. Skogquist
*Attorney*—Pennie, Edmonds, Morton, Taylor & Adams

[57] ABSTRACT

Apparatus for training and exercise with respect to the mechanical athletic side of horsemanship except for displacement and speed, the apparatus comprising a coordinated structure simulating the trunk, neck and head of a horse and cooperating mechanism providing the motions involved in horsemanship and horseback riding, wherein the trunk includes chest widening and saddle mechanisms and carries a stirrup mechanism, the neck mechanism is pivoted between the trunk and head, and the head carries a bit mechanism and reins for actuating the head and neck by the rider.

14 Claims, 6 Drawing Figures

PATENTED JUN 27 1972

INVENTOR.
Matthijs Johan Eikelenboom

BY
Pennie, Edmonds, Morton, Taylor & Adams

ATTORNEYS

TRAINING APPARATUS

An object of the present invention is to provide a training apparatus offering the possibility for one to practice all aspects of the mechanical athletic side of the various kinds of horsemanship, without the element of displacement and the speed connected therewith. The apparatus also provides the possibility of its being used as a teaching means for all teaching methods (private or general) of all branches of equestrian sport and horsemanship in general.

Another object of the present invention is to provide a training apparatus offering the possibility to obtain:

a thorough familiarity with the shape and dimensions of the horse and the development of physical skill in connection with riding on horseback, such as e.g.:

quick mounting and dismounting without a saddle, both at the left and the right hand sides, quick mounting and dismounting with a saddle, swinging of the legs forwardly or backwardly over the apparatus when sitting, without touching the apparatus, falling exercizes and other exercizes having the above-mentioned object.

In accordance with these objects the general embodiment of the apparatus is used with a saddle or with a back cushion at the position of the saddle.

Another object of the present invention is the development of those muscles which should be seen as the base of the athletic side of horsemanship and which provide surety to the rider during riding a horse (buttock muscles, groin and other muscles of the legs) and the learning of leg and rein indications (aids) in combination with each other.

This purpose is achieved by a novel chest mechanism in combination with mechanisms of the neck piece, the head piece and the reins.

Another object of the present invention is to provide a training apparatus offering the possibility for one to develop the balance, set indications (aids), the practicing of the rhythm feeling necessary for said purpose and the additional strengthening and rendering souple of the muscles of back and loins which are used for this purpose, the learning of the coordination of the movements of the pelvis, the gradual obtaining of a correct leg position, the more advanced learning of aspects of horsemanship, such as the application of the various leg indications (aids) in combination with the various actions of the reins.

The novel saddle and stirrup mechanism in combination with the mechanism of the back and head piece with reins serve to carry out these objects.

So far, when designing similar apparatus on behalf of equestrian sport it has been tried to obtain a natural as possible simulation of the movements of the horse below the rider. In the known apparatus the movements usually are generated by an additional movement of the rider, which movements have nothing to do with horse riding at all, e.g. by a level mechanism at the front side of the apparatus, which mechanism is connected with a saddle mechanism. The movement then is manually generated, or a movement which is transferred via a mechanism to the saddle mechanism by alternately heavy leaning and pressing on the stirrups. There are variations and combinations of said embodiments. Also mechanisms are known, with which the rider by moving up and down in the saddle actuates a mechanism in the saddle mechanism which would be an imitation of the movements of the back of a horse in action.

Later proposals are the same in principle, but they are characterized by a more technical perfectness of the mechanisms for the simulations of the movements of the horse below the rider. Here the movements are generally generated by the force of a motor (electric motor) in order to effect a natural as possible simulation of the horse below the rider by means of various coupling means and accelerators.

It is believed that it does not make sense to simulate or imitate in whichever way the movements of the horse in a mechanical manner, since apparatus for this purpose would become much too expensive and would not lead to the purpose aimed at, because the manner in which one and the same horse puts down its legs and sets its feet in any gait, differs enormously. It is not a matter of acceleration and changing of speed only. Each horse differs in its movements so greatly from those of another horse (no two horses move in the same way) that the mechanical imitation of said movement makes little sense.

In contradistinction to the known apparatus the invention aims to provide a sport apparatus to promote the athletic development of the rider by means of a complex of mechanisms which together form an apparatus which practices the muscles which are used in horsemanship, develops them and keeps them supple and at the same time comprises a teaching method.

British Pat. specification No. 577 159 relates to a wooden base with at the front an upright rod (resilient) or steel lath or steel blade spring, up to about chest height of a normal human body. The user is to stand on two resilient foot supports provided on the base (instead of sitting as on a horse), grip a handle at the end of an upright spring attached to the front and push said spring forward and backward, allowing his body to sag simultaneously on the foot supports and make a swishing up and down movement. These movements differ considerably from the movements of the rider on horse, even to the degree that it is risky for a rider to practice in this way for a long time.

The invention is further elucidated with reference to the accompanying diagrammatic drawings.

Figure 3:
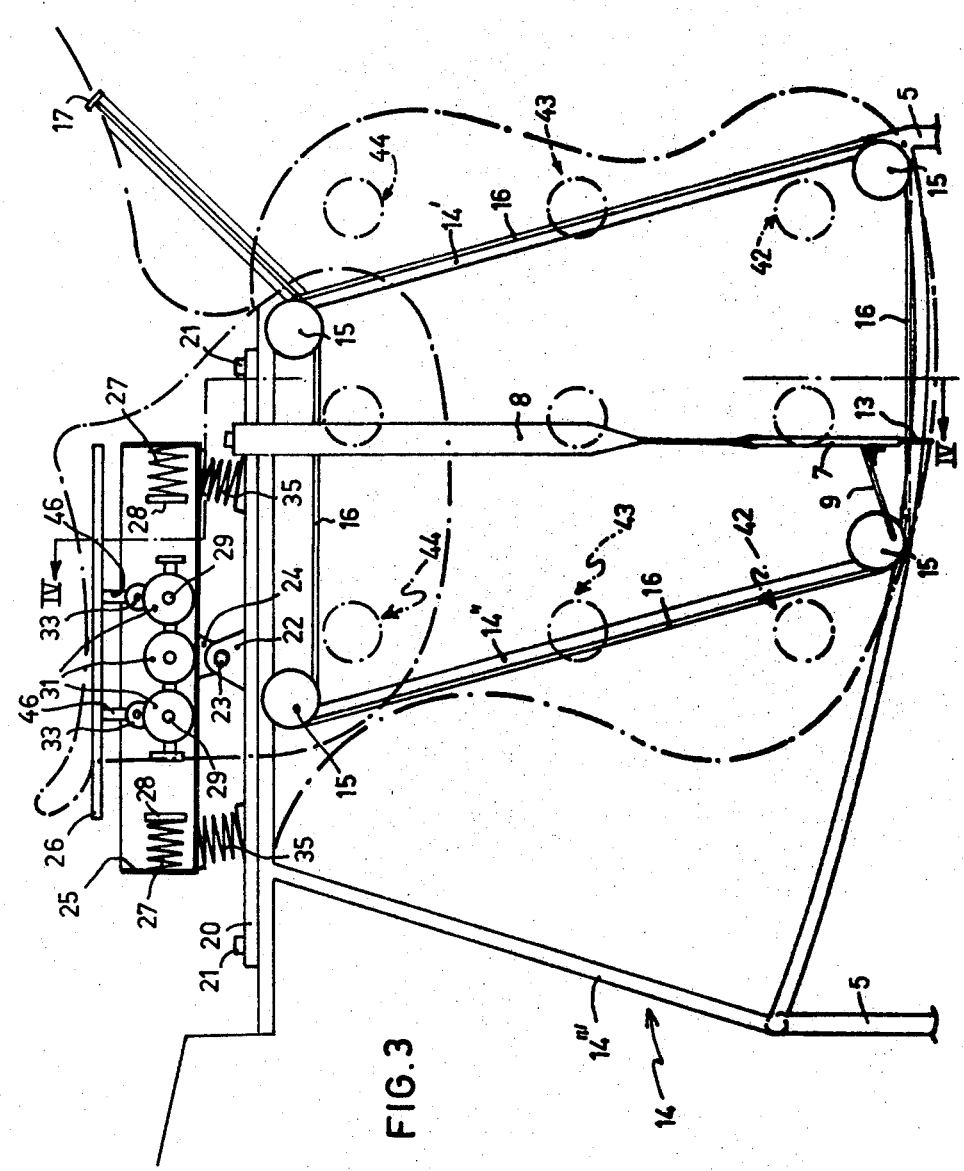

FIG. 3 displays a chest widening mechanism, saddle mechanism, stirrup mechanism and stirrup fastening means.

Figure 4:
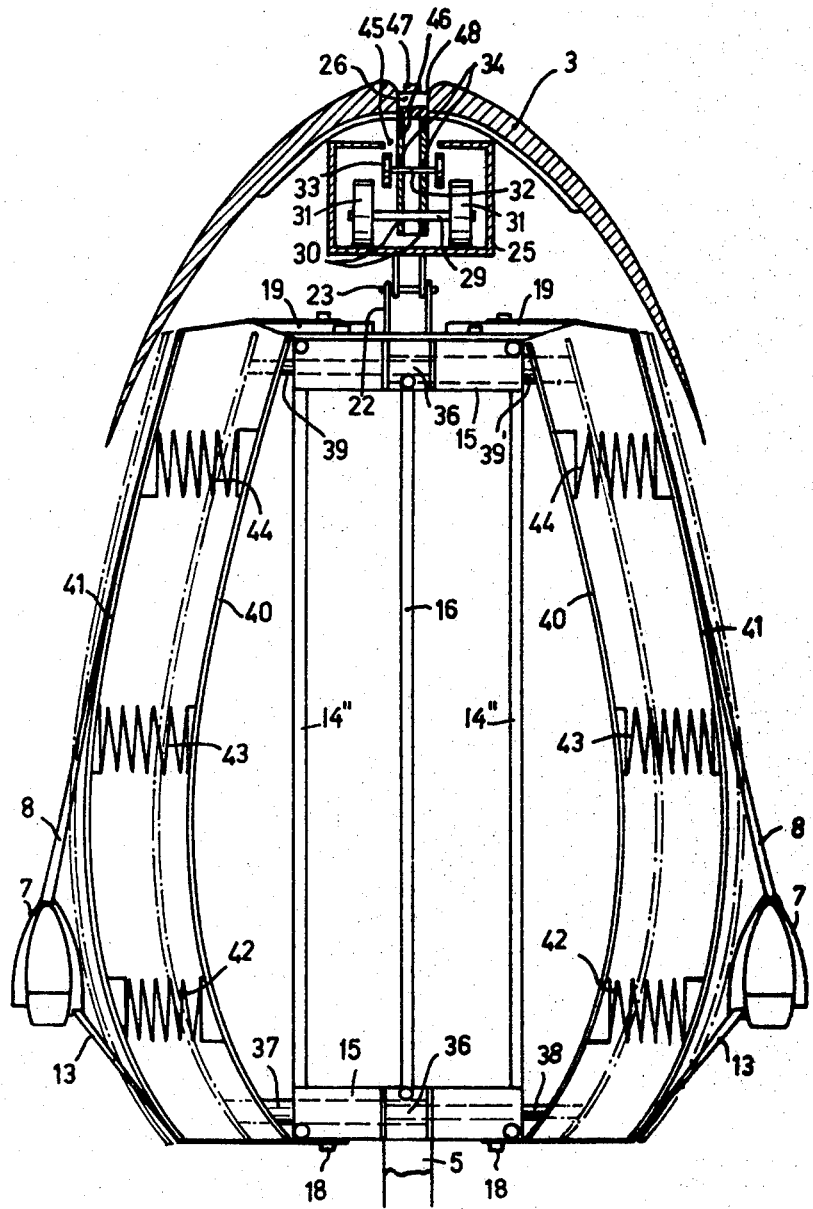

FIG. 4 is a cross section of FIG. 3 on the line IV—IV in FIG. 3.

Figure 5:
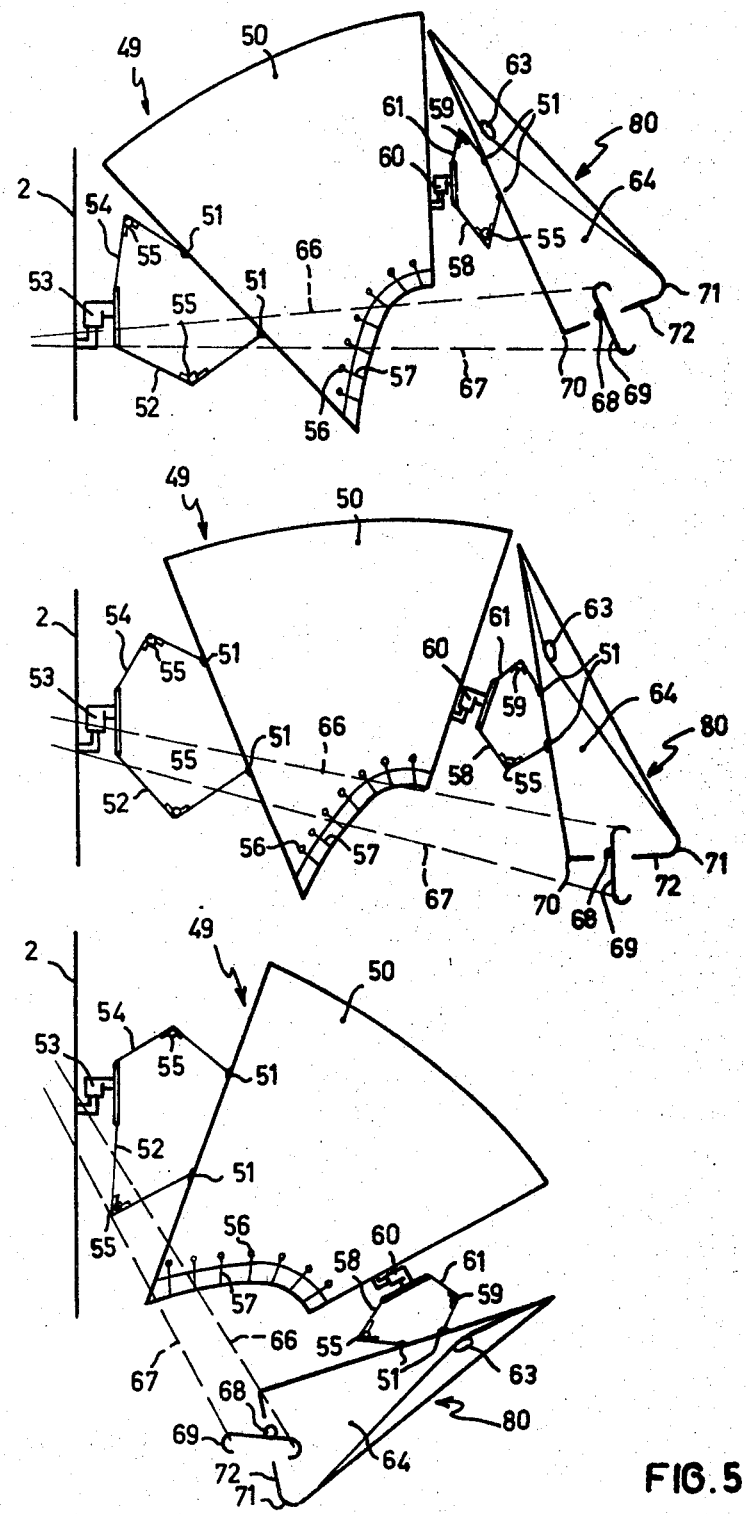

FIG. 5 is a representation of the head-neck mechanism in three positions.

Figure 6:
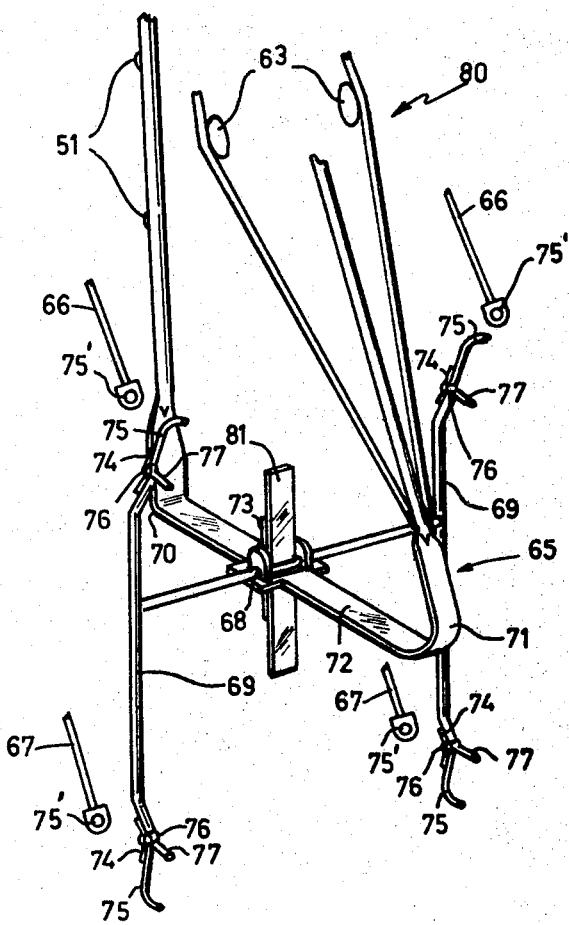

FIG. 6 displays the bit mechanism in perspective.

Figure 1:
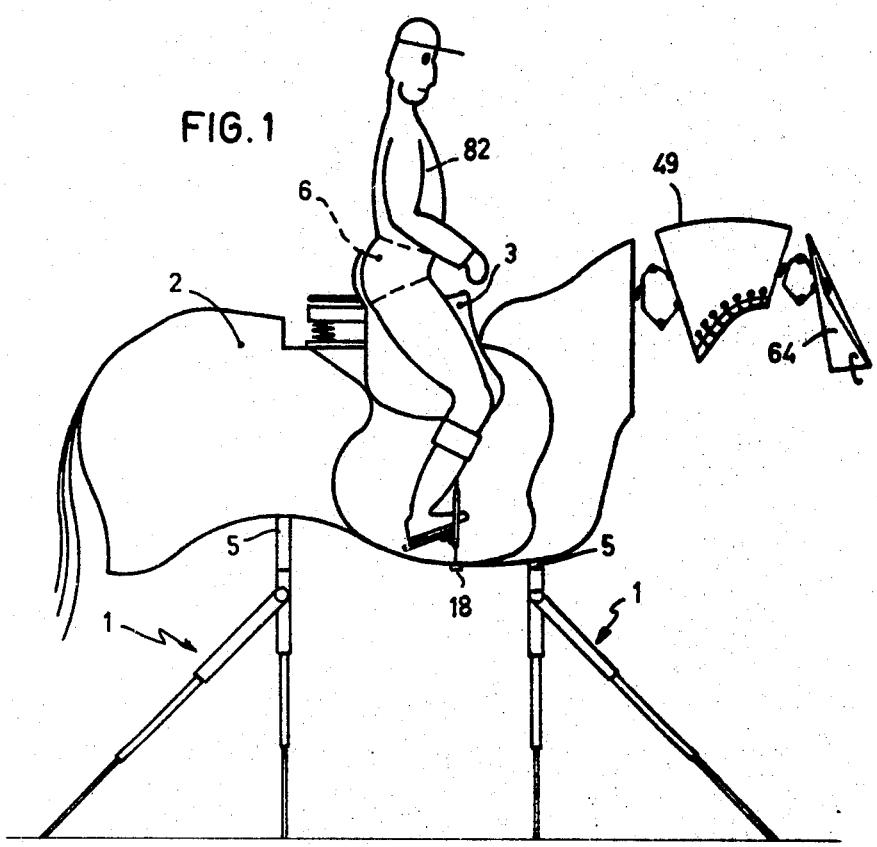
FIG. 1 is a side view of the apparatus with a rider in training position.

The apparatus, as illustrated in FIG. 1 is supported on a front support 1 and a rear support 1. Each support consists of a tripod, each leg of which being composed of leg portions which can be telescopically shifted one into another. They can be fastened in respect of each other.

The apparatus has a trunk 2 consisting of a tubular frame 14 (FIG. 3) with saddle and stirrup mechanisms mounted thereon and tubular systems for the front and hind quarters of the horse. Front and hind quarters are covered with canvas or the like. The apparatus has the fundamental ratios and shape of the average riding horse.

The rider 82 is represented in training position at the moment that he practices the sitting trot on the saddle and the tilting of the pelvis on the saddle mechanism. The saddle 3 is in its foremost position and the rider tilts his pelvis 6 backward in order to have the saddle rotate over the dead point above the point of rotation 23 of the saddle (FIG. 3) and to tilt same backward.

At the front the trunk of the horse is coupled to the head-neck mechanism which will be described herebelow.

For the sake of clearness the reins are not represented in FIG. 1. The points where the supports 1 are connected with the trunk frame are indicated by 5.

Figure 2:
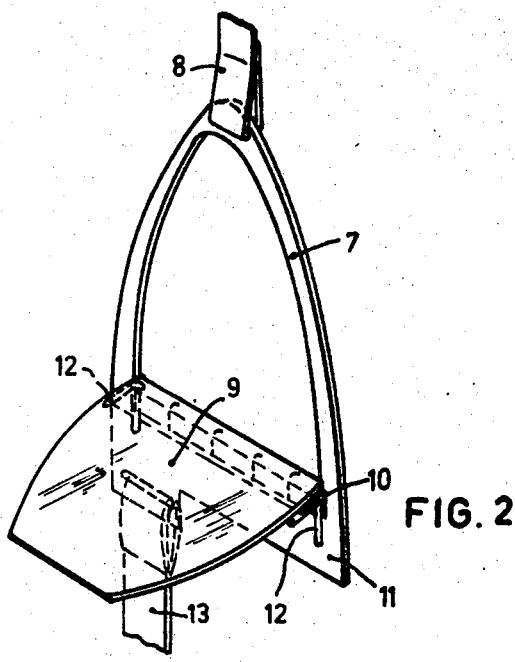
FIG. 2 is a perspective representation of the stirrup mechanism.

It appears from FIG. 2 that each stirrup 7 has substantially the same shape as a conventional stirrup. The stirrup strap 8 extends through an opening in the top of the stirrup. Said strap is attached at its upper end to the frame 14 by means of the suspension bracket 19 (FIG. 4). At the lower side, where a conventional stirrup would end at the tread, the stirrup 7 extends further downwards (over about 5 cm) and constitutes a plate 11. The lower stirrup strap 13 extends through an opening in the lower side of said plate 11. The strap 13 which at its other end is attached to the frame 14 by means of bolts and nuts 18 (FIG. 4) has a buckle (not shown). The strap 13 then can be removed, if desired.

The lower portion of the stirrup 7 includes the stirrup tread 9 pivotally attached to the stationary shaft 10 of the stirrup. The tread 9 may pivot on the shaft 10. The tread extends from this shaft to the rear over a distance of about 30 cm and is generally perpendicular to the stirrup 7 and the stirrup plate 11. In the angle enclosed by the tread 9 and the plate 11, two curved hair pin springs 12 are located. The one end of each spring is attached to the rear of the plate 11 and the other end to the bottom of the tread 9. The tread 9 is maintained in its correct position by the spring and it derives its resilient action from said springs when loaded.

When the rider puts his foot into the stirrup, correctly presses on the normal bottom of the stirrup (the stationary tread with shaft) with the ball of his foot, he will force the resilient tread 9 downwards, against the resistance of the stirrup springs 12. The function of the stirrup mechanism is control and development of the correct position of the leg, with the emphasis on the posture of the foot and lower leg portion: to teach the rider is to keep his heels down and to press them downwards to obtain the stronger deep seat and good balance resulting herefrom and to get supple ankle joints.

The stirrup strap 13 maintains the stirrup in its position until the rider has learned to control his movements and to coordinate them. When the rider is capable of keeping his legs and feet in the correct position without the stirrup being held at its lower end, the strap 13 may be removed.

It appears, particularly from FIGS. 3 and 4, that the trunk frame 14 is constructed of three rectangles. Two of said rectangles 14' and 14'' are parallel and incline obliquely backward. The rectangle 14' begins over the point of attachment 5 of the front foot support 1. The rectangle 14'' begins approximately in the center between the points of attachment 5 of the foot supports 1 and its frame structure is shown more completely in FIG. 4. The third rectangle 14''' begins over the point of attachment 5 of the rear foot support 1 and inclines obliquely forward. Said rectangles are made of tubes. The lower transverse tubes 15 of the rectangles 14'' and 14' are connected at their centers by means of a connecting tube. It appears from FIGS. 3 and 4 that the lower transverse tube 15 of the rectangle 14'' has a large diameter. Said transverse tube 15 is connected at its ends, by means of tubes, with the ends of the large transverse tube 15 of the rectangle 14'. Also the upper transverse tubes 15 of the rectangles 14' and 14'' have a large diameter. At the top the three rectangles are mutually connected by means of a horizontal tube system, the tubes of which connect the ends of the upper transverse tubes of the rectangles.

The chest widening mechanism is mounted on the frame structure formed by the tubes of the rectangles 14' and 14''. The said mechanism comprises four ratchet wheel systems 36 which are diagrammatically represented in FIG. 4, each being situated in the center of a transverse tube 15 and being mutually connected by four connecting rods 16 (FIGS. 3 and 4). The rachet wheel system which is located in the forward upper transverse tube 15 has a handle 17 extending obliquely forward through a slot in the frame of the withers. The handle 17 consists of a tube in which a rod is situated which extends beyond the tube at the top and has a knob at said end, as shown in FIG. 3. From below the rod ends in a pawl which engages the teeth of the ratchet wheel. By moving the handle to and fro always pressing and releasing the knob, the forward and backward movement is transferred to the ratched wheel system by means of the handle, said movement being translated to a rotating movement of the ratchet wheel which transfers said rotating movement to the ratchet wheel systems in the three other tubes 15 by means of the connecting rods 16.

Since the ratchet wheel systems are known per se, they are not completely represented. For the sake of completeness a ratchet wheel system is briefly described. In this connection it is observed that tubes extend to both sides beyond the end of each large transverse tube 15. The tubes extending beyond the end of the lower transverse tubes 15 are indicated by 37, 38, in FIG. 4 whereas the tubes extending beyond the upper transverse tubes 15 are indicated by 39, 39'. At their ends said four tubes carry on each side of the trunk frame 14 the two spaced panel assemblies 40, 41 of the chest widening mechanism. Each ratchet wheel 36 has an inner thread cooperating with outer thread of an extending tube such as the tube 37 or 39' respectively, extending through the ratchet wheel. Said tube also has inner thread the pitch of which is contrary to that of the outer thread of said tube and cooperates with outer thread of the tube 38 or 39, respectively which is inside the tube 37 or 39', respectively. By rotating the ratchet wheel the said tubes are axially shifted in respect of each other in the transverse tubes 15 due to the threading action. By displacing the tubes in the transverse tubes 15 in this way the rider can move the two ride panel assemblies 40, 41 in respect of each other, vide the dotted lines in FIG. 4.

Each panel assembly consists of two arcuate panels, an inner panel 40 and an outer panel 41. Between said panels three spring systems 42, 43 and 44 are mounted one above the other, as shown in FIG. 4. Each system consists of three springs which are equally spaced, as shown by the nine dot-and-dash circles in FIG. 3.

It is the intention that the rider in the saddle 3 is forced to assume a more spread seat than would be the case on a normal horse. The outer panels 41 then, by means of the spring systems, offer resistance to the pressure of the rider's legs hanging down at both sides. Thus they give the rider the opportunity to strengthen his leg and loin muscles by leg-squeezing exercises and to get a firm leg position. In this connection it is remarked that said chest widening mechanism could also be used, if desired, by other sports people, e.g. skaters, skiers, etc. wishing to develop their leg muscles.

On the top of the frame 14 the saddle mechanism is arranged, the lower portion of which consists of the tube system 20, shown in FIG.3. Said tube system supports the entire saddle mechanism on the trunk frame 14. The tube system is provided with eight holes (not shown), and screws 21 extending through four holes connect the tube system with the trunk frame mechanism. The four other holes are at some distance behind the front holes of the four first-mentioned holes and provide the possibility to displace the saddle mechanism backward and to give the saddle a changed position in respect of the suspension point of the stirrup straps 8. In this way it is possible to use the saddle as a training saddle or a spring saddle.

Also there is the possibility, by means of a cushion, fitting in the place of the saddle mechanism, to use the entire trunk for various exercises intended to make one supple, such as mounting and dismounting, swinging over the legs, learning to fall, improving the balance.

The tube system 20 consists of two spaced parallel tubes which are connected by three spaced transverse tubes. At the top of the middle transverse tube there is the support 22 of the saddle mechanism. Said support comprises a twice journalled shaft 23, connecting the support 22 with the support 24 of the saddle carriage box 25, as shown in FIG. 4. A saddle carriage 26 is arranged above the box 25 and comprises a tube system. At the front and at the rear of the box 25 a buffer spring 27 is mounted. At the bottom of the carriage box six wheels 31, arranged as three pairs, are mounted by means of double bearings 30 on the three shafts 29 extending through spaced uprights 46 as shown in FIG. 4. Said shafts are transverse to the longitudinal direction of the frame of the saddle carriage 26. At the top of the saddle carriage box two of the four upper wheels 33 are represented in FIG. 3, which are twice journalled by means of bearings 34 on the ends of the upper spaced shafts 32 which are arranged in the uprights 46 transversely to the longitudinal direction of the saddle carriage. The frame of the saddle carriage 26, the upper parts 46 of which extend through the slot 45 in the top of the saddle box 25, have screw bores in the top. They have the purpose to receive screws 47 attaching the saddle 3 to the saddle carriage member 26. The screw holes present in the saddle are provided in the front and the rear of a saddle slot 48 extending in longitudinal direction in the center of the saddle.

The buffer springs 27 consist of compression springs which are located at the inside of the ends of the saddle box 25 and at their inner ends are protected by a buffer plate 28.

The saddle enables the rider to practice the correct movements of the sitting trot, rising trot and "going with the gallop" when he turns with his bottom around the shaft 23 by means of the saddle carriage 26, makes the saddle carriage 26 roll forward and backward and teaches his pelvis 6 to tilt.

In case of a too rough movement of the rider the buffer springs 27 may cause a shock effect by means of the saddle carriage 26, which the rider should try to prevent by keeping his balance and controlling the movements of his pelvis. When he is able to control the movements of his pelvis and has found his balance, the movements remain restricted to the rotation of the saddle mechanism over the support 22 and the tilting of the rider's pelvis. The two double action compression-tension springs 35 extending respectively from the bottom end portions of the saddle box 25 to the tube system 20, support and accelerate said movements and take care of a supple tilting action of the saddle box. When the front or the rear of the carriage rises, owing to a rough movement, the carriage cannot get stuck in the box because the wheels 33 keep rolling against the lower side of the upper wall of the saddle box.

At the top portion of that part of the saddle carriage, parts 46, which extends through the slot 45 of the saddle box 25 a shaft (not represented) may be mounted centrally and in the longitudinal direction of the saddle carriage, for example in place of the carriage member 26, which shaft at three places is connected with the saddle carriage situated below it. Between said connecting points of said shaft with the saddle carriage two or more bearing rings provided with bearings are located at two or more places and enveloping said shaft.

Each of said bearings is enclosed in a housing which is attached to a superimposed tube which is parallel to said shaft on which the saddle is mounted. Said construction makes it possible to have the saddle also make a lateral oscillating movement, on the understanding that said movement will be limited and can be eliminated at any moment by a clamping screw or another simple, known mechanism.

The head-neck mechanism represented in FIG. 5 can be subdivided in three parts: the connecting pieces between trunk 2 and neck piece 49, the connecting pieces between neck 49 and head piece 64 and the bit and rein mechanism. Said three sub portions render the three rein actions possible in the vertical plane of the curb rein 67 and the snaffle rein 66 and also the combination thereof. The three most extreme positions which may be the result of the curb and snaffle reins are represented in the three representations of FIG. 5. Combinations of said three positions are possible. The three representations of FIG. 5 display the action of the snaffle rein, the riders hands feeling both reins and the action of the curb rein, respectively. By applying a pulling force to the snaffle rein as in the upper view, neck piece 49 and head piece 64 are raised. In the second representation neck piece and head piece are in the normal extended position. By applying a pulling force to the curb rein as in the lower view the neck piece is curved and the head piece is bent downwards.

The neck piece 49 is covered with canvas 50. Said covering is secured by strings 57 passing through eyes 56.

In the three representations of FIG. 5 from the left to the right the strong pivotable hinge ("paumelle") 53 is shown which readily and detachably connects the neck-head mechanism with the trunk of the apparatus and permits a rotation of said mechanism in the horizontal plane, furthermore the lower and upper link rod systems 52 and 54, respectively, connecting the pivot 53 with the rear side of the neck piece 49 which at its front carries a strong pivotable hinge ("paumelle") 60 which functions like the hinge 53 and is connected with the rear of the head piece 64 by means of the upper and lower link rod systems 61 and 58.

The legs of the link rod systems are capable of folding together or stretching by means of the arcuate hair pin springs 55 and 59, respectively, situated at the inside of the link rod systems. The link rod systems 58, 61 are smaller than the link rod systems 52, 54. The link rod systems are connected with the rear of the neck piece 49 and the head piece 64, respectively by means of small pivoting torsion springs 51, permitting a rotation upwards or downwards.

The head d piece 64 has an eye 63 at both sides. Said eyes are situated at the same location as the eyes of a real horse. They have a striking color and play a part in the coordination of the rein actions which are possible with the apparatus.

The head piece 64 includes a tube system 80 comprising a chin 70, a nose 71 and a flat broad bottom tube 72 of the bit mechanism 65 (vide FIG. 6). In the center of the bottom tube 72 lies the pivot point of the bar 68 of the bit, extending at right angles through the bottom tube 72. This appears from FIG. 6 diagrammatically representing elements of the head piece in perspective. The flat broad bottom tube 72 merges at its ends in the upright tubes of the head piece. Said tubes are not broad and flat, but small and round.

A check piece 69, consisting of an upper and a lower branch is fixedly mounted at each end of the bar 68.

There where the bar 68 passes through the flat broad bottom tube 72, an upper and a lower branch of a middle piece 81 of the bit mechanism are situated. The bottom tube has a slot in its upper and lower face through which the upper and lower branch of the middle piece 81 extends. The branches of the middle piece 81 are parallel to the branches of the check pieces 69 but are of a larger width and shorter length.

At the rear of the middle piece or bar 81 of the bit mechanism two arcuate hair pin springs 73 of the bit mechanism are located both in the upper angle and in the lower angle, determining the upper and the lower position of said middle bar 81 with respect to the base tube 72.

When a pulling force is exerted on the top branches of the check pieces 69 by means of the snaffle rein 66, the two uppermost hair pin springs 73, push the bottom tube 72 downwards. The head piece then raises itself. When a pulling force is exerted on the bottom of the check pieces 69 by means of the curb rein 67, the hair pin springs 73, situated at the bottom of the base tube 72, push the said tube upwards. The head piece then bends down.

The branches of the check pieces 69 have a release pawl 75 at the ends. The ends of the reins can be attached to the bit mechanism 65 by sliding a ring 75' over a hook of said release pawl. Said release pawls are attached with their other ends in a pivot point 76 to the ends of the branches of the check pieces 69. At the rear, on the chin side 70 of the head piece, a nearly stretched hair pin spring 74 is present which, on the one hand, is mounted to the rear of the release pawl 75 and on the other hand, to the tapered rears of check pieces 69.

When the reins are pulled too strongly and the rearward pressure on the release pawl 75 becomes too great, said pawl rotates about its pivot point 76 over an angle of about 140° backward and the ring 75' snaps loose from the hook of the release pawl. The rider then is, owing to his faulty handling of the reins, forced to dismount and to attach the reins anew. This has the pedagogic action that a hard, rough hand is prevented or curved.

Two rein safety pawls 77 extend straight forward and prevent the shifting to and fro of the rein ring 75', so that it remains in its place.

The release pawls at the top and at the bottom of the check pieces 69 are exactly equal.

I claim:

1. Apparatus for training and exercise with respect to the mechanical athletic side of horsemanship except for displacement and speed, the apparatus comprising coordinated structures respectively simulating the trunk, neck and head of a horse, cooperating mechanisms to be actuated by a rider for providing the motions involved in horsemanship and horseback riding, said trunk including a chest section provided with an adjustable chest-widening means extending downwardly along under the legs of the rider, a saddle mechanism mounted at the upper portion of the trunk and including a saddle for the rider extending downwardly over a portion of the chest section of the trunk, means movably interconnecting the saddle to the trunk, means for pivoting the neck portion of the simulated horse to the trunk and for pivoting the head to the neck, and reins connected to the lower part of the head and operable by the rider to effect pivoting of the head and neck with respect to each other and with respect to the trunk.

2. An apparatus as claimed in claim 1, including a stirrup mechanism at each side supported by a strap connected to the upper portion of the trunk, each stirrup proper comprising a plate leaving an opening for receiving the toe of the rider, a tread pivoted to the back bottom portion of the plate, and means biasing the tread upwardly.

3. An apparatus as claimed in claim 1, wherein the head structure includes means providing chin and nose elements connected by a bottom member, bit mechanism including a transverse bar pivoted to the bottom member, a middle piece connected to the bar having upwardly-and-downwardly-extending spring-biased branches, a check piece fixed to each end of the bar extending at right angles thereto, and means for connecting a rein end to each check piece, the arrangement being such that a pulling force applied to the reins by the rider acts through a spring-biased branch of the middle piece and the bottom member to effect vertical movement of the head.

4. An apparatus as claimed in claim 3, wherein each check piece includes upper and lower branches, a snaffle rein connected to the upper branches and a curb rein is connected to the lower branches for respectively effecting the raising and lowering of the head.

5. An apparatus as claimed in claim 3, wherein the means for connecting a rein end to a check piece includes a spring-biased release pawl on the end of the check piece for releasing the rein therefrom in response to an excessive pull on the rein.

6. An apparatus as claimed in claim 1, wherein the trunk includes a longitudinal frame and the saddle mechanism is carried on top of the frame and includes a saddle carriage, the saddle carriage comprising a longitudinally-extending shaft means attached to the saddle and permitting a lateral oscillating movement of the saddle and rider.

7. An apparatus as claimed in claim 1, wherein the trunk includes a central longitudinal frame and the chest widening means includes a panel assembly at each side of the frame for acting on the legs of the rider, and means including a handle for moving the panel assemblies.

8. An apparatus as claimed in claim 7, including a panel assembly of two spaced panels at each side of the frame, means for biasing the panels of each assembly away from each other, and wherein the moving means includes means for moving the panels of each assembly with respect to each other.

9. An apparatus as claimed in claim 1, wherein the neck is pivotally mounted on the front end of the trunk for up and down and sidewise movement and the head is pivotally mounted on the front end of the neck for up and down and sidewise movement, the head including a tube system comprising chin and nose connected to a bit mechanism, and curb and snaffle reins connected to the bit mechanism for actuating the head and neck.

10. An apparatus as claimed in claim 9, wherein the bit mechanism includes a bar pivoted at a right angle to the piece connecting the chin and nose, and a pair of check pieces connected to the bar, said reins being connected to the check pieces.

11. An apparatus as claimed in claim 7, wherein the central longitudinal frame comprises three interconnected four-sided frame units, two of which are parallel and incline obliquely backward while the other, the rear unit, inclines obliquely forward.

12. Apparatus for training and exercise with respect to the mechanical athletic side of horsemanship except for displacement and speed, the apparatus comprising coordinated structures respectively simulating the trunk, neck and head of a horse, cooperating mechanisms to be actuated by a rider for providing the motions involved in horsemanship and horseback riding, wherein the trunk includes a longitudinally-extending frame and a saddle mechanism carried on top of the frame, said saddle mechanism including a saddle support pivoted to the frame for forward and back rocking.

13. An apparatus as claimed in claim 12, wherein the support comprises a saddle box, a saddle carriage mounted in the box for forward and back movement, and a buffer in each end of the box.

14. An apparatus as claimed in claim 12, wherein the central frame includes a horizontal tubular frame unit to which the saddle support is pivoted, and forward and back tension spring means between and connecting the saddle support with said horizontal frame unit.

* * * * *